United States Patent [19]
Rabl et al.

[11] 4,120,565
[45] Oct. 17, 1978

[54] PRISMS WITH TOTAL INTERNAL REFLECTION AS SOLAR REFLECTORS

[75] Inventors: Arnulf Rabl; Veronika Rabl, both of Downers Grove, Ill.

[73] Assignee: The United States of America as represented by the United States Department of Energy, Washington, D.C.

[21] Appl. No.: 807,105

[22] Filed: Jun. 16, 1977

[51] Int. Cl.² .................................................. G02B 5/04
[52] U.S. Cl. ..................................... 350/286; 126/270; 350/292; 350/293
[58] Field of Search ................ 126/270, 271; 350/102, 350/103, 106, 109, 167, 286, 287, 292, 293

[56] References Cited

U.S. PATENT DOCUMENTS

| | | | |
|---|---|---|---|
| 3,254,556 | 6/1966 | Staunton | 350/286 X |
| 3,972,583 | 8/1976 | Lobb | 350/286 UX |
| 4,012,115 | 3/1977 | Brown | 350/106 X |

OTHER PUBLICATIONS

Winston, *Applied Optics*, vol. 15, No. 2, Feb. 1976, pp. 291 and 292.

*Primary Examiner*—F. L. Evans
*Attorney, Agent, or Firm*—Dean E. Carlson; Frank H. Jackson; Paul A. Gottlieb

[57] ABSTRACT

An improved reflective wall for radiant energy collection and concentration devices is provided. The wall is comprised of a plurality of prisms whose frontal faces are adjacent and which reflect the desired radiation by total internal reflection.

9 Claims, 9 Drawing Figures

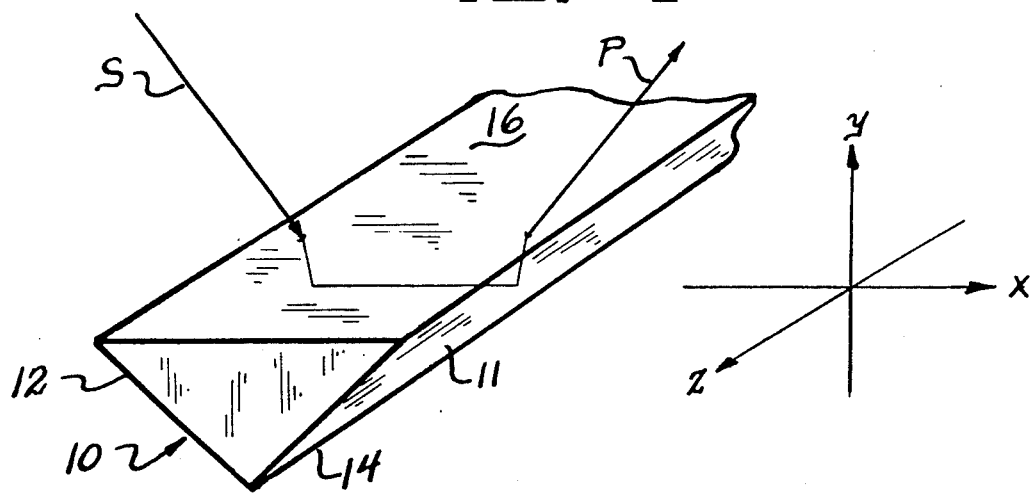
FIG.—1
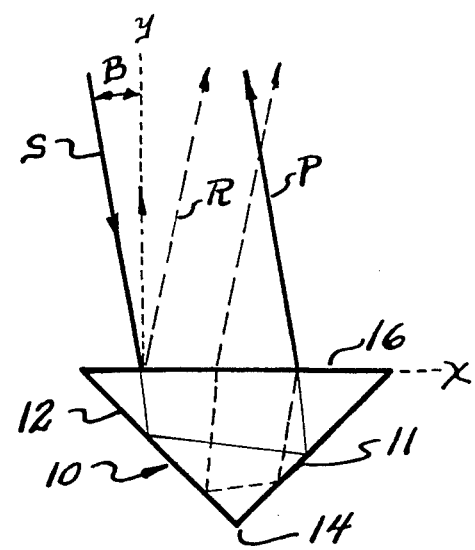
FIG.—2
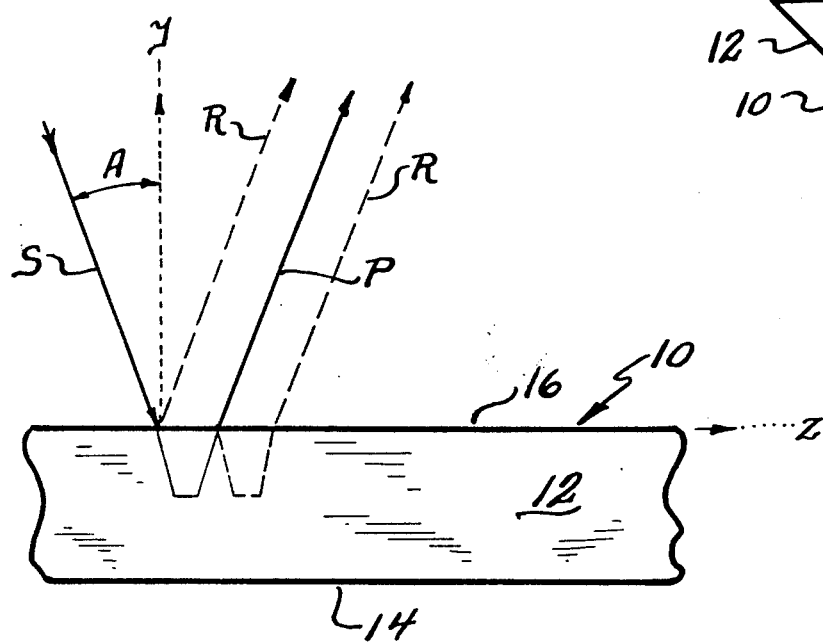
FIG.—3

PRISMS WITH TOTAL INTERNAL REFLECTION AS SOLAR REFLECTORS

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

For the sake of good optical efficiency, the reflectivity of mirror surfaces in solar collectors should be as high as possible. Until now, most solar reflectors have used aluminum with efficiencies in the 80-90% range. Even the best material, silver, allows reflectivities only up to 95%. With total internal reflection (TIR), on the other hand, effective reflectivity is limited only by absorption in the transparent medium, and absorption losses can be kept well below 5%. Since TIR occurs only under special circumstances, its use for solar energy collectors may be somewhat limited. One particular example, proposed by Winston, utilizes a solid refractive medium with TIR as described in Applied Optics, February 1976. His device is well suited for solar cells, and can also be used to build spectrally selective windows for thermocollectors. However, in most solar-thermal applications, the dimensions of aperture and absorber rule out this design because a prohibitively large quantity of material would be needed.

It is therefore an object of this invention to provide an improved reflective wall for solar energy concentration collection device.

Another object of this invention is to provide an improved reflective wall for solar energy collection and concentration devices having a high reflectivity.

SUMMARY OF THE INVENTION

In a radiant energy concentration and collection device, there is provided an improved reflective wall having high reflectivity for the given angles of acceptance. The improved wall is comprised of a plurality of rectangular prisms positioned so that the frontal faces of each prism are adjacent. The contour of the frontal face and back edge correspond to the ideal coutour well known for a variety of radiant energy collection devices such as line focus parabolas, point focus parabolas, trough shapes and cone shapes.

BRIEF DESCRIPTION OF THE DRAWINGS

FIG. 1 is a perspective view of a typical prism;
FIG. 2 is a view along the xy plane of FIG. 1;
FIG. 3 is a view along the yz plane of FIG. 1.

DETAILED DESCRIPTION OF THE PREFERRED EMBODIMENT

Referring to FIG. 1 there is shown a three-dimensional view of a rectangular prism 10. A rectangular prism is a three-sided prism having two side faces 11 and 12 of equal length which meet at a 90° angle to form the back edge 14 of the prism. Frontal face 16 is the third face and is opposite back edge 14. Consider the effect of the prism upon an incident ray S of energy on frontal face 16. FIG. 2 shows the projection of S in the xy plane, while FIG. 3 shows the projection of S in the yz plane.

In FIGS. 1, 2 and 3, P is the ray ideally reflected by the prism. Assuming that the refractive index n of the material of prism 10 is high enough with respect to the refractive index of the surrounding environment, reflection from side faces 11 and 12 will be by TIR. In the yz plane of FIG. 3, the prism will act as a specular reflector and in the xy plane of FIG. 2 the prism will act as a retroreflector. Of course, due to Fresnel reflections at frontal face 16, some radiation will be specularly reflected in the direction R and not P. Clearly, all rays leaving the prism will be parallel to either P or R. In the applications of the prism to be described herein, both P and R point towards the desired location of energy collection for each device and therefore the effective reflectivity of the prism is indeed 100% apart from absorption losses.

Figure 4:
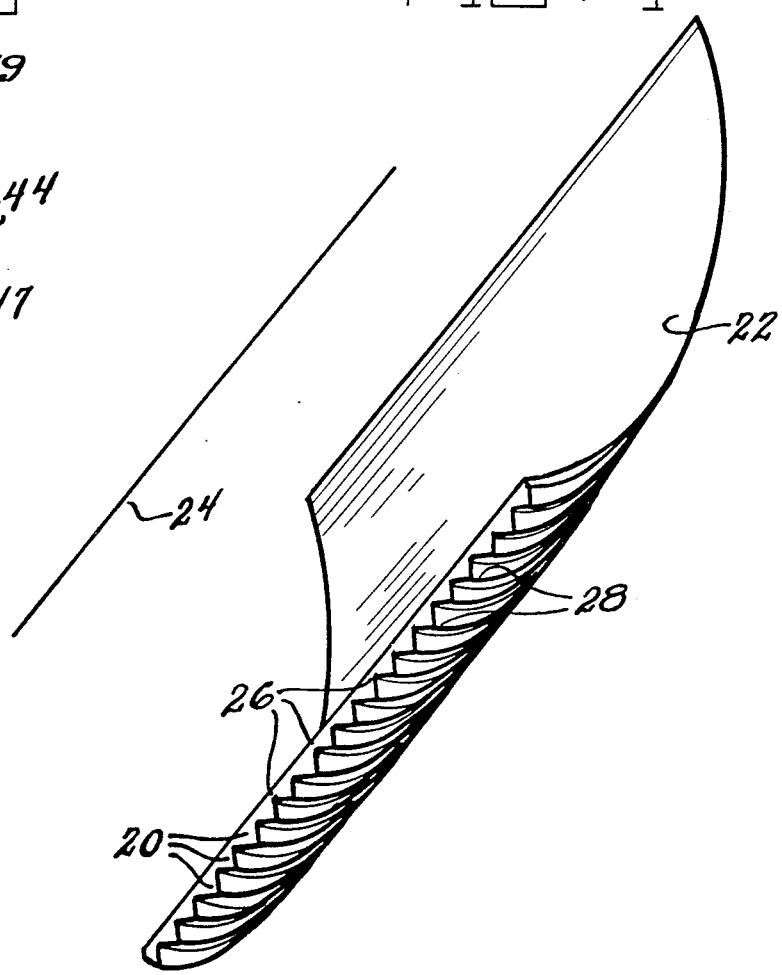
FIG. 4 shows a line focus parabola system.

Application of a plurality of prisms as a reflective wall for a solar energy concentrator device is shown in FIG. 4, FIG. 5, FIG. 6 and FIG. 7. In each case, a plurality of prisms are positioned adjacent each other. In FIG. 4 the plurality of adjacent prisms 20 form the reflective wall of a line focus parabolic reflector, where energy incident on the frontal faces 22 of each prism 20 within a given acceptance angle are directed to be incident along the line focus 24. For collection of solar energy, such a device is normally oriented so that the line focus lies in the east-west direction. The grooves 26 between each adjacent prism are parallel in the north-south direction to ensure both rays reflected specularly and rays retroreflected are directed towards line focus 24. The frontal face and the back edge 28 of each prism 20 are parallel and curved in the parabolic contour well known for such a line focus parabolic collector.

Figure 5:
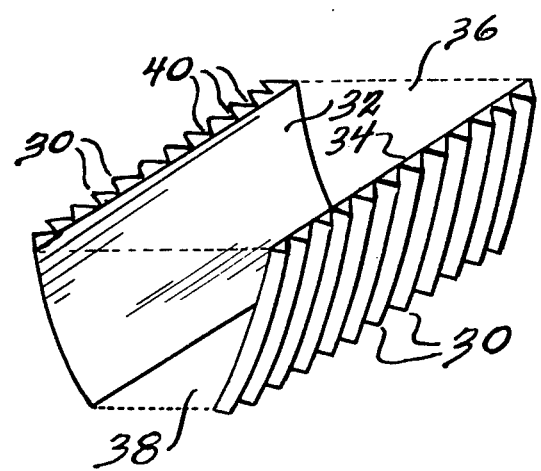
FIG. 5 shows a trough-shaped system.

In FIG. 5 the plurality of adjacent prisms 30 form the reflective side walls 32 and 34 of a trough-shaped radiant energy concentration device, such as those described in U.S. Pat. Nos. 3,923,381, 3,957,031 and 4,002,499. Energy incident on the frontal face of each prism 30 within a given acceptance angle at the entrance aperture 36 is directed to be incident at the exit surface 38 of smaller area than the entrance aperture 36. For collection of solar energy such a device is normally oriented so that the trough runs east to west. The grooves 40 between each adjacent prism extend between the entrance aperture 36 and exit surface 38. This ensures that rays reflected specularly and rays retroreflected are directed towards the exit surface. The exit surface may be open, or coincident with the exit surface, there may be an energy absorber. The frontal face and back edge of each prism are parallel and contoured according to well known principles for such devices as described in the aforementioned patents. Where a trough with a cusp is to be used as described in the '499 patent, the prisms extend around to form the cusp.

Figure 6:
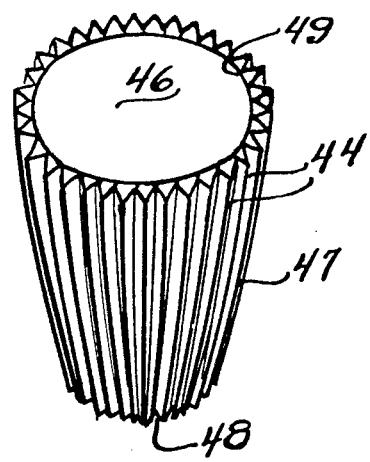
FIG. 6 shows a cone-shaped system.

In FIG. 6 there is shown the adjacent prisms 44 forming a cone-shaped collector as described in the '381 and '031 patents. Here there is in effect only one wall formed of prisms 44 whose contour is rotated about an axis. The device has an entrance aperture 46 and an exit aperture 48. The prisms 44 are aligned so that their back edges 47 are parallel to each other and to their frontal faces 49 and so that the frontal faces 49 and back edges 47 extend between the entrance aperture 46 and the exit aperture 48.

Figure 7:
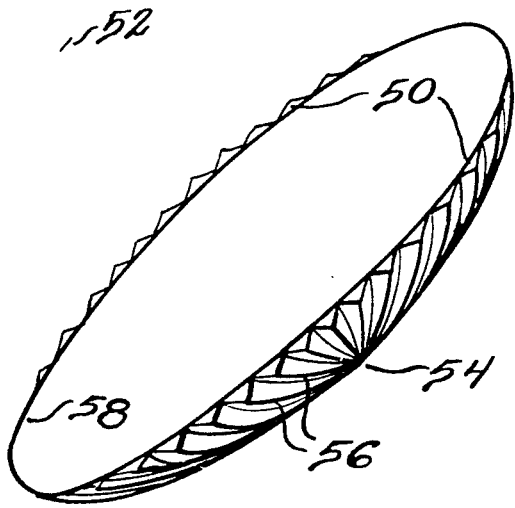
FIG. 7 shows a point-focused parabola system.

Referring to FIG. 7, there is shown a point focus parabolic reflector. Energy incident on the adjacent prisms 50 is directed to be incident at a particular focal point 52. The prisms are aligned so that the back edges and the frontal faces extend radially from a central point 54. The back edges 56 and frontal faces 58 are not parallel but rather they are concentric parabolas with the same apex at point 54. This is necessitated by the convergence of all prisms at point 54.

In each example, the prisms are aligned so that both the specular and retroreflection associated with each prism direct the desired energy towards a particular location, either a point, a line, or an area. An energy absorber would normally be positioned at this particular location for the purpose of utilizing the collected energy.

Figure 8:
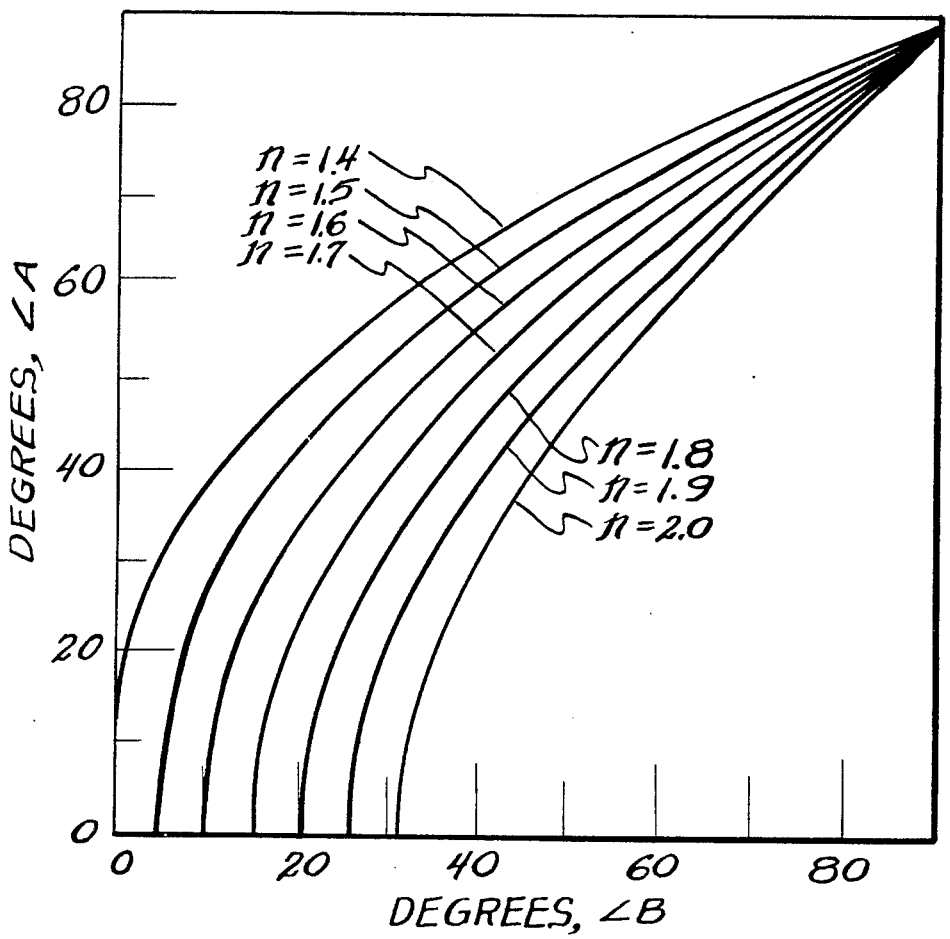
FIG. 8 shows a plot of the angles at which TIR occurs for the typical prism.

In utilizing prisms for concentration of energy from a radiant energy source such as the sun or a primary energy collector, it is necessary to minimize leakage of radiation through the back of each prism. That is, TIR for desired angles of incidence of radiation must be maximized. If for given values of the angle A, shown in FIG. 3, which S makes with the y axis in the yz plane and of the refractive index n, the angle B which x makes with the y axis in the yx plane as shown in FIG. 2, is smaller than a critical value $B_c$ then TIR will occur both at face 12 and face 11. For $B_c \geq A$, on the other hand, some radiation will escape. A restriction on the applicability of these prisms to solar collectors arises from the limited range of incidence angles for which such TIR occurs. Referring to FIG. 8, there is shown the boundary of the angular region over which an individual prism can be used for this purpose. FIG. 8 shows values of refractive index of between $n = 1.4$ and $n = 2.0$. In FIG. 8 the boundary is specified in terms of the projected angles A and B as defined in FIGS. 1, 2 and 3. For example, if $B = 0$, the range of angles A for which no radiation leaks out through the sides of the prisms is $\pm 5°$ for $n = 1.5$ (e.g., ordinary glass or plexiglass), and $\pm 21°$ for $n = 1.8$ (e.g., lead crystal glass). A trough collector, as shown in FIG. 5, arranged in the east-west direction, should have a range of $\pm 2.5°$ for the A angle in order to guarantee at least 7 hours of collection time per day. With $n = 1.5$ this restricts the angle B to be at least 69°. The smallest angle of incidence occurs for rays striking the bottom of a trough-shaped collector. A prismatic trough-shaped collector will probably find more general use as a second stage concentrator for point focus systems and for polar mount line focus systems. For these applications the range of incidence angles is small enough not to impose the angular restriction. Of course, if media with n greater than 2.0 can be found, then larger acceptance angles will be practical. In the polar mounted line focus systems, with seasonal tilt adjustments, the range of angles of acceptance necessary is only $\pm 6°$, easily small enough to permit the use of TIR prisms for the second stage concentrator.

Consideration of the line focus system shows that in the east-west direction, the sum moves about 15° per hour, and hence the solar collector should be able to accept half angles of at least 50°. In a line focus system which tracks around the east-west axis, the prism grooves of a prismatic reflector run in a north-south direction. To guarantee 7 hours of of collection each day, an index of refraction of at least 2.4 would be required. However, if the tilt of the line focus system with north-south axis is adjusted, seasonally the acceptance angle can be much smaller, and ordinary material such as glass or acrylic are adequate. Approximately 14 tilt adjustments per year are needed to assure minimum collection time of 7 hours a day; with more frequent adjustments, the collection time will be increased significantly, especially around the equinoxes.

A point focus parabola has to track continuously to keep its optical axis directed towards the sun at all times. Therefore, the angle of incidence of the sun on any point of the parabola is independent of time, and it is easy to design prismatic reflectors for this application. If the prism grooves are aligned radially away from the apex of the parabola, then TIR is guaranteed to occur everywhere. A strictly radial pattern of growth is of course impractical near the apex itself, because of the variation in groove depth; but this problem can be circumvented by chosing parallel grooves in the vicinity of the apex. Any optical aberration caused by such a patchwork are negligible in view of the high concentration values achievable by solar collectors with point focus parabolas.

Figure 9:
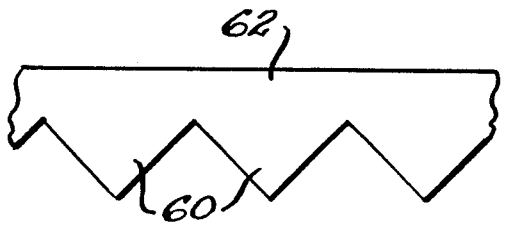
FIG. 9 shows a manufactured example of a series of prisms.

The configurations of collectors illustrated and the fact that prisms can be made of materials such as plastics allows for well known mass production techniques to be utilized to form the reflective walls. No exotic materials or fabrication techniques are required. Glass is attractive because of its durability, but its melting point makes it more difficult to mold than plastics. Among plastics, acrylic ($n = 1.491$), NAS ($n = 1.562$), polycarbonate ($n = 1.586$) and styrene ($n = 1.590$) are examples of satisfactory materials. The thickness of the prisms would generally be on the order of a half a centimeter, a size which lends itself to manufacture with plastics by extrusion or injection molding. Accuracy requirements for the prisms should be higher than for conventional reflectors because twice as many reflections take place. Surface contour errors on the order of $\frac{1}{4}°$ to $\frac{1}{2}°$ are tolerable. Referring to FIG. 9 there is shown an alternate form of the adjacent prisms. Here prisms 60 are formed as one piece with a uniform upper section 62 to which all prisms 60 are attached. For some material, this structure will ease handling and manufacturing and result in a stronger reflector.

The embodiments of the invention in wich an exclusive property or privilege is claimed are defined as follows:

1. In a radiant energy concentration collection device having at least one reflective wall of particular contour for directing received radiant energy to a particular location in concentrated form, the improvement in said wall, comprising:

a plurality of rectangular prisms positioned so that the frontal faces thereof abut and correspond in contour to said particular contour, the prisms being aligned so that both rectroreflection and specular reflection by total internal reflection associated with each prism is toward the particular location.

2. The device of claim 1 wherein the device is a point focus parabolic concentrator and the particular location is the focal point thereof, each of said prisms extending radially from the apex of said parabolic concentrator.

3. The device of claim 1 wherein the device is a line focus parabolic concentrator and the particular location is the focal line thereof, said focal line extending in a first direction and the frontal faces of each of said prisms being parallel to each other and extending generally in a second direction perpendicular to said first direction.

4. The device of claim 3 wherein said first direction is east-west and said second direction is north-south and the device is positioned to receive radiant energy from the sun.

5. The device of claim 1 wherein the device is a nonimaging radiant energy concentrator which directs radiant energy incident on an entrance aperture within a given angle of acceptance to an exit surface of smaller area than said said entrance aperture, said wall extending between said entrance aperture and said exit surface, the frontal faces of each of said plurality of prisms being parallel to each other and extending between and perpendicular to said entrance aperture and said exit surface.

6. The device of claim 5 wherein said nonimaging concentrator is cone shaped with said wall symmetric about an axis.

7. The device of claim 5 wherein said nonimaging concentrator is trough shaped, said wall including opposing wall sections.

8. The device of claim 1 wherein said plurality of prisms are formed as a single piece of plastic.

9. The device of claim 8 wherein said single piece of plastic includes prism sections extending from a thick linear section.

* * * * *